United States Patent
Tanimichi et al.

(10) Patent No.: US 7,822,525 B2
(45) Date of Patent: Oct. 26, 2010

(54) TRAVEL CONTROL DEVICE AND TRAVEL CONTROL METHOD

(75) Inventors: Taisetsu Tanimichi, Mito (JP); Motohiro Higuma, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 125 days.

(21) Appl. No.: 11/914,811

(22) PCT Filed: Sep. 14, 2005

(86) PCT No.: PCT/JP2005/017323

§ 371 (c)(1), (2), (4) Date: Nov. 19, 2007

(87) PCT Pub. No.: WO2007/032091

PCT Pub. Date: Mar. 22, 2007

(65) Prior Publication Data

US 2009/0088940 A1    Apr. 2, 2009

(51) Int. Cl.
B60T 7/12 (2006.01)
G06F 17/00 (2006.01)
G08G 1/16 (2006.01)
G60T 13/18 (2006.01)

(52) U.S. Cl. .......................... 701/74; 701/54; 701/301; 303/11

(58) Field of Classification Search .................. None
See application file for complete search history.

(56) References Cited

U.S. PATENT DOCUMENTS 5,938,712 A * 8/1999 Ibamoto et al. ............... 701/54
6,058,347 A * 5/2000 Yamamura et al. ............ 701/96
7,273,122 B2 * 9/2007 Rose .......................... 180/165
2001/0006305 A1 * 7/2001 Nakamura et al. ............ 303/11
2004/0093145 A1 * 5/2004 Tanimichi et al. ............ 701/93
2008/0172153 A1 * 7/2008 Ozaki et al. .................. 701/36

FOREIGN PATENT DOCUMENTS

| JP | 2001-138880 A | 5/2001 |
| JP | 2002-283985 A | 10/2002 |
| JP | 3427727 B2 | 5/2003 |
| JP | 2003-205830 A | 7/2003 |
| JP | 2004-268847 A | 9/2004 |
| WO | WO2005028269 | * 3/2005 |

OTHER PUBLICATIONS

International Search Report dated Dec. 13, 2005 (Two (2) pages).

\* cited by examiner

*Primary Examiner*—Jack Keith
*Assistant Examiner*—Muhammad Shafi
(74) *Attorney, Agent, or Firm*—Crowell & Moring LLP

(57) ABSTRACT

In brake liquid pressure control, a time wasted after the control is started until brake application is actually started is reduced and pulsation noise of brake liquid pressure is reduced. When automatic following control of a vehicle is being operated, a motor for pressure increase is set to idle if a predetermined condition at which the vehicle starts deceleration is reached before an automatic brake command is issued from an automatic following control device. Further, when the throttle of an engine is at predetermined condition at which rapid acceleration does not occur, brake liquid pressure is increased to a level at which the vehicle does not decelerate.

9 Claims, 16 Drawing Sheets

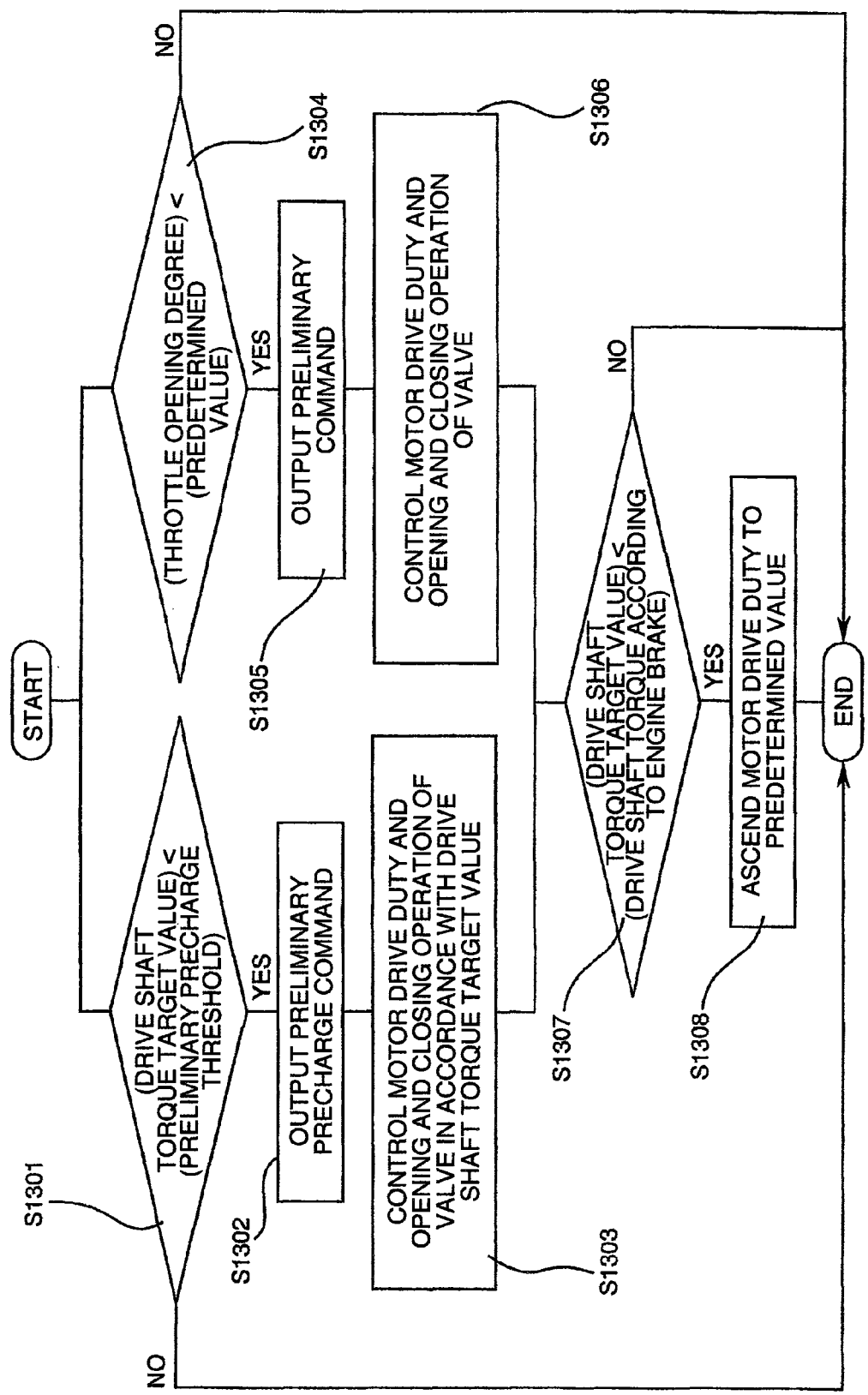

TRAVEL CONTROL DEVICE AND TRAVEL CONTROL METHOD

TECHNICAL FIELD

The present invention relates to an automatic brake control in an automatic following control device.

BACKGROUND ART

There has been known an automatic following control device for the purpose of reducing a driving operation work of a driver and achieving a safe travel in an express highway or the like. The automatic following control device is structured such as to detect a following distance and a relative speed between an anteceding car and a self car by an object detecting device attached to a front portion of a vehicle, and control each of actuators of a vehicle in such a manner that the following distance coincides with a previously set target following distance.

In the case that the anteceding car is decelerated, the automatic following control device of the self car executes a decelerating control, for example, by a brake, so as to bring the previously set target following distance into line with an actual following distance between the anteceding car and the self car. As an example of a method of executing the brake control, there is a method of generating a brake liquid pressure by utilizing a pump-up function of a brake liquid pressure of an actuator such as a VDC or the like so as to apply a brake. In the brake control mentioned above, a brake control amount target value (a brake liquid pressure, a deceleration, a drive shaft torque or the like) for keeping the following distance is calculated by a following distance control portion, and a brake control is executed by a control device such as the VDC or the like in accordance with the brake control amount target value.

However, since a certain amount of brake fluid is consumed, there is generated a wasted time until the brake control target value is calculated, the brake is actually operated, and the vehicle starts decelerating.

Accordingly, patent document 1 (JP-B2-3427727) discloses a technique for making a wasted time until a brake is actually applied after starting increasing a brake liquid pressure, by increasing the brake liquid pressure to such a degree that a brake pad comes into contact with a brake rotor, before starting the deceleration by actually applying the brake and in the case that there is no possibility that the vehicle is accelerated, that is, in the case that "an actual throttle opening degree and a target throttle opening degree are both equal to or less than a predetermined value", in a control of a brake booster.

However, in the case of making the wasted time until the brake is actually applied as short as possible, such as the prior art mentioned above, there is a problem that a pulsation sound of the brake fluid is transmitted into a vehicle chamber, thereby obstructing a quietness of the vehicle.

Particularly, at a time of starting the automatic brake control, a deviation between the brake control amount target value from the following distance control portion and the actual brake control amount becomes large. Accordingly, a rapid change of the brake liquid pressure is necessary for bringing the actual brake control amount into line with the brake control amount target value, and the pulsation sound becomes large.

Further, if the brake is operated in a state in which the throttle of the engine is open wide, "accelerating motion" and "decelerating motion" are simultaneously generated, and this is unsatisfactory for safety. Accordingly, it is impossible to increase the brake liquid pressure to such the degree that the brake pad comes into contact with the brake rotor, before fully closing the throttle.

Accordingly, an object of the present invention is to shorten the wasted time with no problem for safety so as to reduce the pulsation sound of the brake liquid pressure, at a time of controlling the brake liquid pressure.

DISCLOSURE OF THE INVENTION

Therefore, in accordance with the present invention, if a predetermined condition for starting a deceleration of a vehicle is established before an automatic brake command is output from an automatic following control device during an automatic following control operation of the vehicle, a motor for increasing a pressure is idle run. Further, if a throttle of an engine comes to a predetermined condition in which a rapid acceleration of the vehicle is not generated, a brake liquid pressure is increased to such a degree that the vehicle is not decelerated.

BEST MODE FOR CARRYING OUT THE INVENTION

Figure 1:
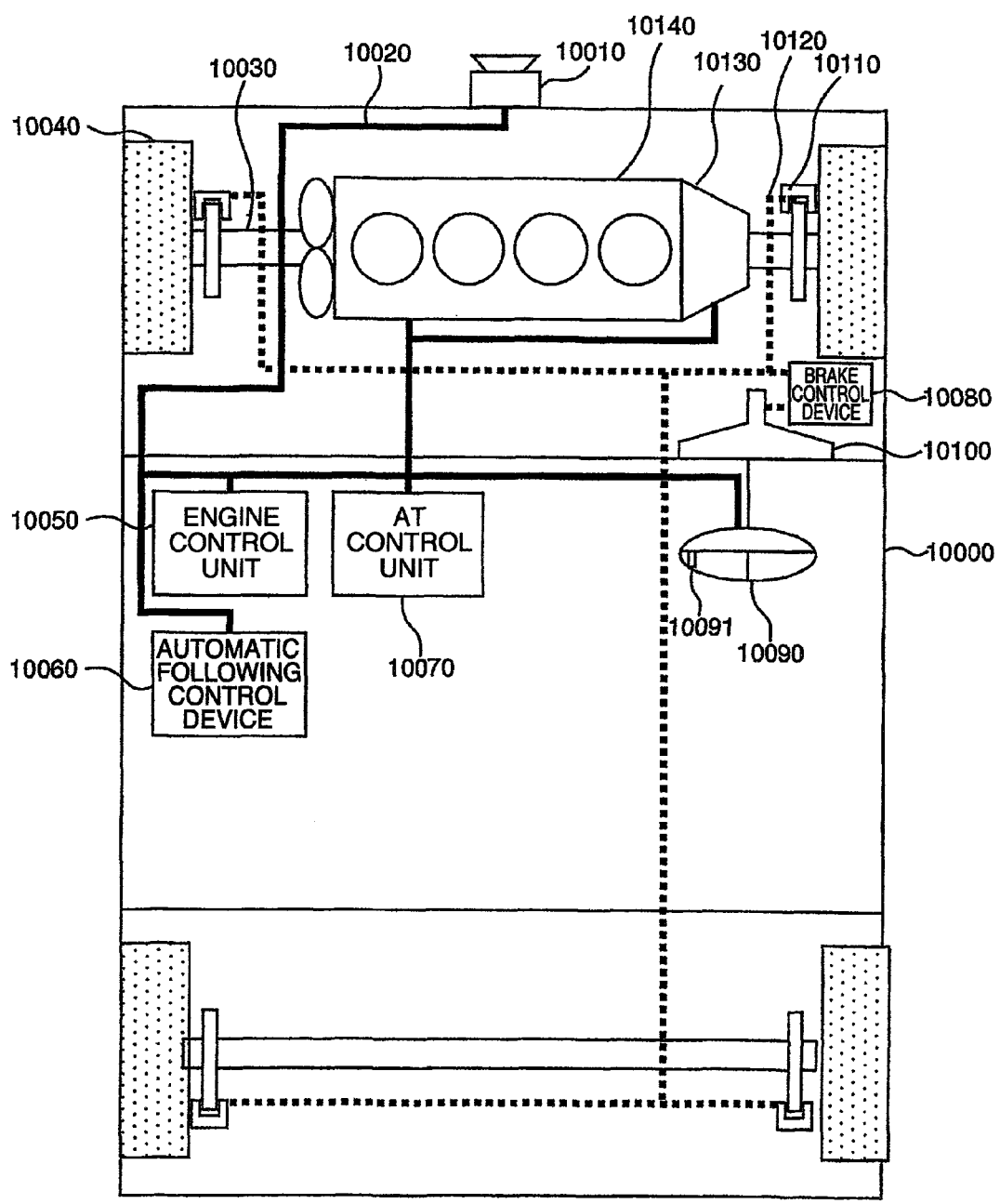
FIG. 1 is a system structure view of an automatic following control device.

A description will be given of a system structure on a vehicle with reference to FIG. 1.

A radar 10010 measures a following distance between a self car 10000 and an anteceding car. The radar is employed in the present embodiment, however, the present sensor may employ the other devices than the radar such as a camera or the like, as far as the device can recognize a position and a shape of the anteceding car and an obstacle.

A wire harness 10020 connects each of sensors, each of units and each of actuators, and includes a signal line and a power line. A drive shaft 10030 transmits a driving force from an engine 10140 to a tire 10040. An engine control unit 10050 controls an engine. An automatic following control device 10060 controls a vehicle speed and a following distance of a vehicle on the basis of a following distance and a relative speed detected by the radar 10010. The AT control unit 10070 controls an automatic transmission (AT). A brake control device 10080 controls a brake device 10110.

The engine control unit 10050, the AT control unit 10070 and the brake control device 10080 may be constituted by a control device having a structure in which two elements of three are integrated, or having a structure in which three elements are integrated. Further, there may be employed an integrated control device which is connected to each of three units so as to execute an integrated control. The control units and the automatic following control device 10060 are connected via the wire harness 10020, and transmit and receive the signals with each other.

A steering wheel 10090 has an interface portion 10091 of the automatic following control device 10060. The interface portion 10091 includes an input portion which can set a following travel keeping the following distance in correspondence to a vehicle speed set by a driver on the basis of an information from the radar or the like installed in a vehicle front portion constant, in addition to a constant speed travel controlling at a vehicle speed optionally set by the driver. Further, the interface portion 10091 includes an output portion displaying the vehicle speed optionally set by the driver, and the following distance in correspondence to the set vehicle speed. However, the interface portion 10091 may includes only one of the input portion and the output portion, an installed position thereof is not limited to the steering wheel 10090, but it is desirable to install the interface portion 10091 at a place where the driver easily operates.

A brake booster 10100 has a function of servo assisting a brake pedaling force. The brake device 10110 is constituted by a brake caliper and a brake disc. A piping 10120 of a brake fluid transmits a power to the brake device 10110. Reference numeral 10130 denotes a transmission.

The automatic following control device 10060 calculates a control amount of each of the actuators so as to bring into line with a previously set target following distance on the basis of the following distance and the relative speed measured by the radar 10010. The engine control unit 10050 executes a control of the engine in accordance with the calculated control amount, and the brake control apparatus 10080 executes a control of the brake. In accordance with the structure mentioned above, it is possible to travel in such a manner as to bring the following distance between the self car 10000 and the anteceding car into line with the target following distance. FIG. 1 shows the motor vehicle driven by the engine, however, the power of the motor vehicle may be generated by the other element than the engine, such as a motor or the like.

Figure 2A:
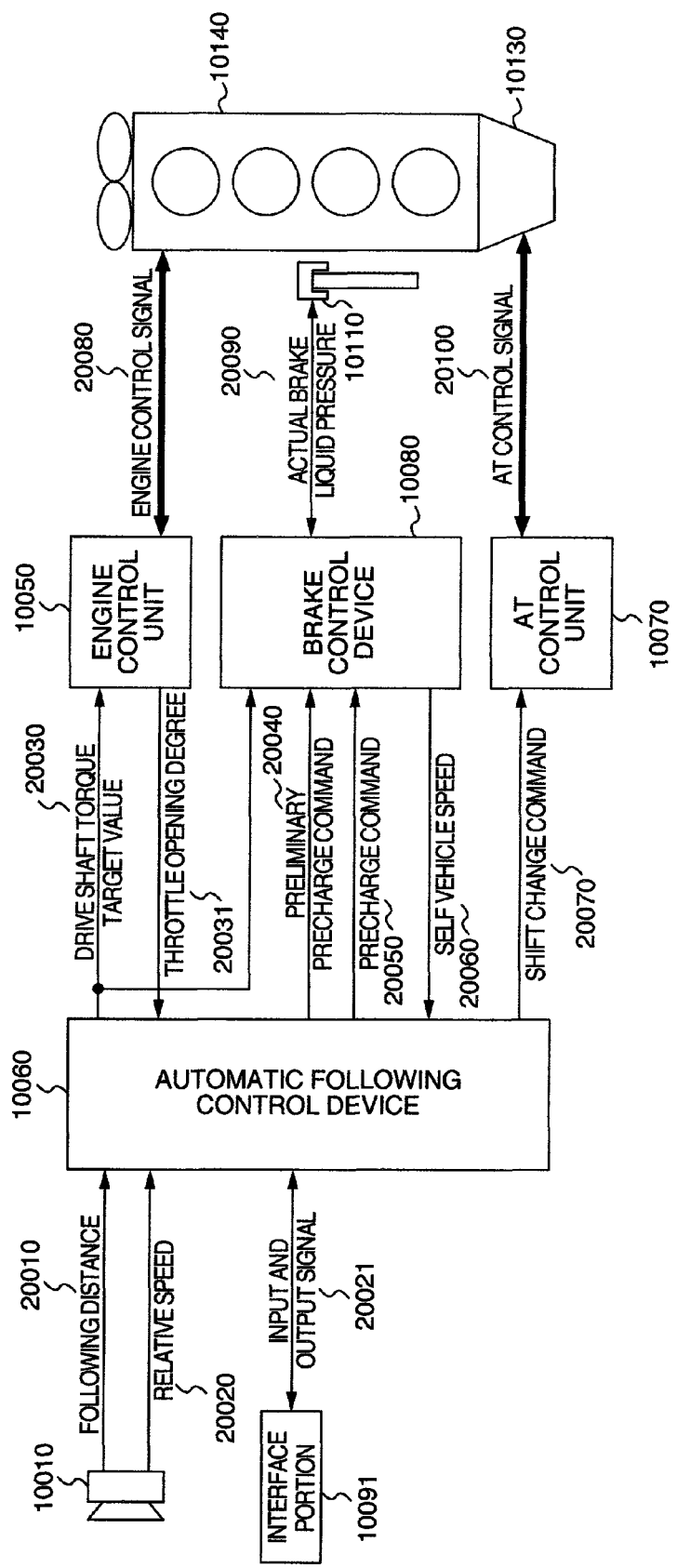
FIG. 2 is a data flow view of the automatic following control device.
Figure 2B:
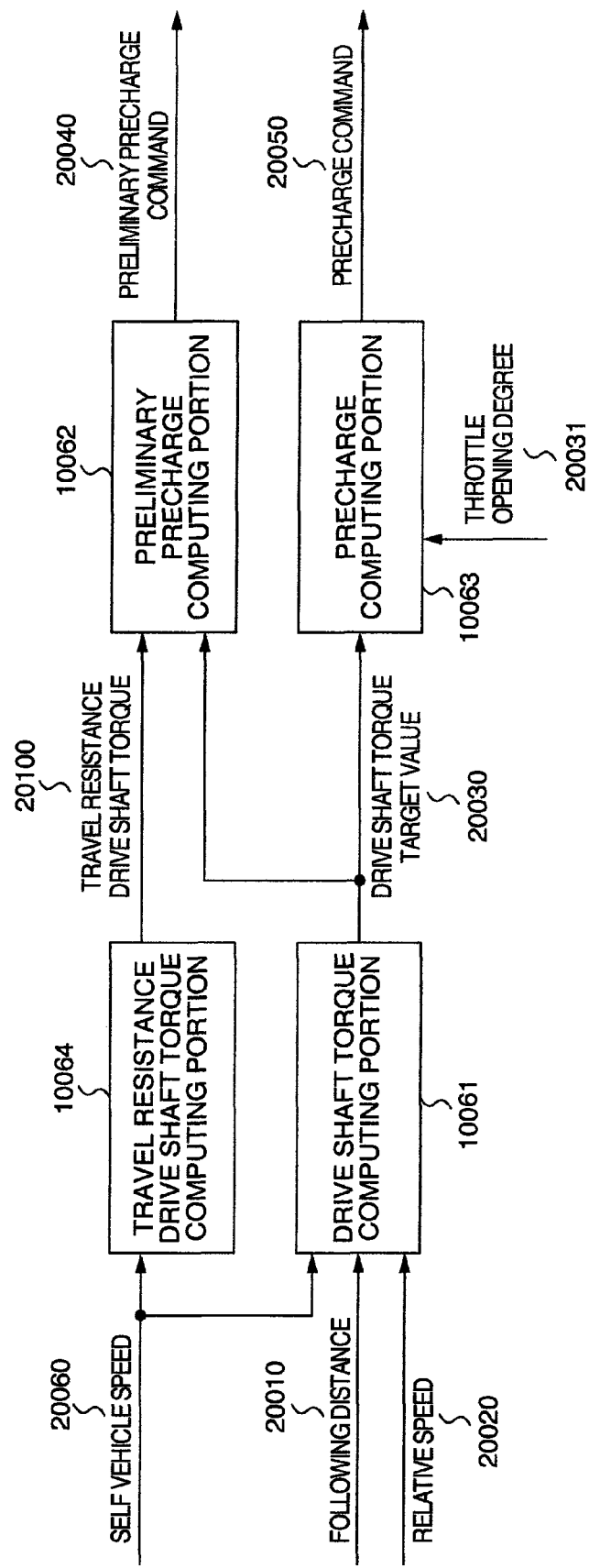

FIG. 2(*a*) shows a data flow within a system. The automatic following control device 10060 acquires a following distance 20010 and a relative speed 20020 between the self car and the anteceding car from the radar 10010. Further, it calculates a drive shaft torque target value 20030 for bringing the actual following distance 20010 into line with a target following distance set by an input signal 20021 of the driver input by the interface portion 10091. The drive shaft torque target value 20030 is calculated on the basis of the following distance 20010 and the relative speed 20020 measured by the radar 10010, and a self vehicle speed 20060 measured by the brake control device 10080. The self vehicle speed 20060 is not limited to be measured by the brake control device 10080, but may employ an information of the sensor or the like installed within the vehicle.

A shift change command 20070 output from the automatic following control device 10060 is output in the case that it is determined that a shift change is necessary in an ascending slope or a descending slope.

The engine control unit 10050 executes a control in such a manner that the drive shaft torque of the vehicle coincides with the drive shaft torque target value 20030, by calculating an engine control signal 20080 for controlling the engine on the basis of the drive shaft torque target value 20030, and controlling the actuator on the engine 10140. The actuator on the engine 10140 means a throttle, an injector, an ignition plug and the like.

The brake control device 10080 executes a control of the brake 10110 by acquiring the drive shaft torque target value 20030 from the automatic following control device 10060, and executing the control of an actual brake liquid pressure 20090 in such a manner that the drive shaft torque of the vehicle coincides with the drive shaft torque target value 20030. Further, the brake control device 10080 executes a preliminary precharge control in the case of receiving a preliminary precharge command 20040, and executes a precharge control in the case of receiving a precharge command 20050, for making an operation sound of a brake liquid pressure silent. A description will be given in detail of the preliminary precharge command 20040 and the precharge command 20050 with reference to FIG. 9.

In the AT control unit 10070, in the case of receiving the shift change command from the automatic following control device 10060, the AT control unit 10070 transmits the AT control signal 20100 to the transmission 10130, and executes a shift down and a shift up of a gear.

FIG. 2(*b*) shows a block diagram relating to the preliminary precharge command 20040 and the precharge command 20050 computed within the automatic following control device 10060. A travel resistance drive shaft torque computing portion 10064 computes a travel resistance drive shaft torque 20100 on the basis of an information of the self vehicle speed 20060 from the brake control device or the like, a vehicle characteristic such as a number of occupants of the vehicle, a kind of a tire and the like. Further, a drive shaft torque computing portion 10061 computes the drive shaft torque target value 20030 on the basis of the information of the self vehicle speed 20060 from the brake control device or the like, and the information of the following distance 20010 and the relative speed 20020 from the radar 10010. These two computing portions may employ a map stored in a memory. The preliminary precharge computing portion 10062 computes the preliminary precharge on the basis of the travel resistance drive shaft torque 20100 and the drive shaft torque target value 20030, and outputs the preliminary precharge command 20040. Further, the precharge computing portion 10063 computes the precharge on the basis of the information of the drive shaft torque target value 20030 and the throttle opening degree 20031, and outputs the precharge command 20050.

Figure 3:
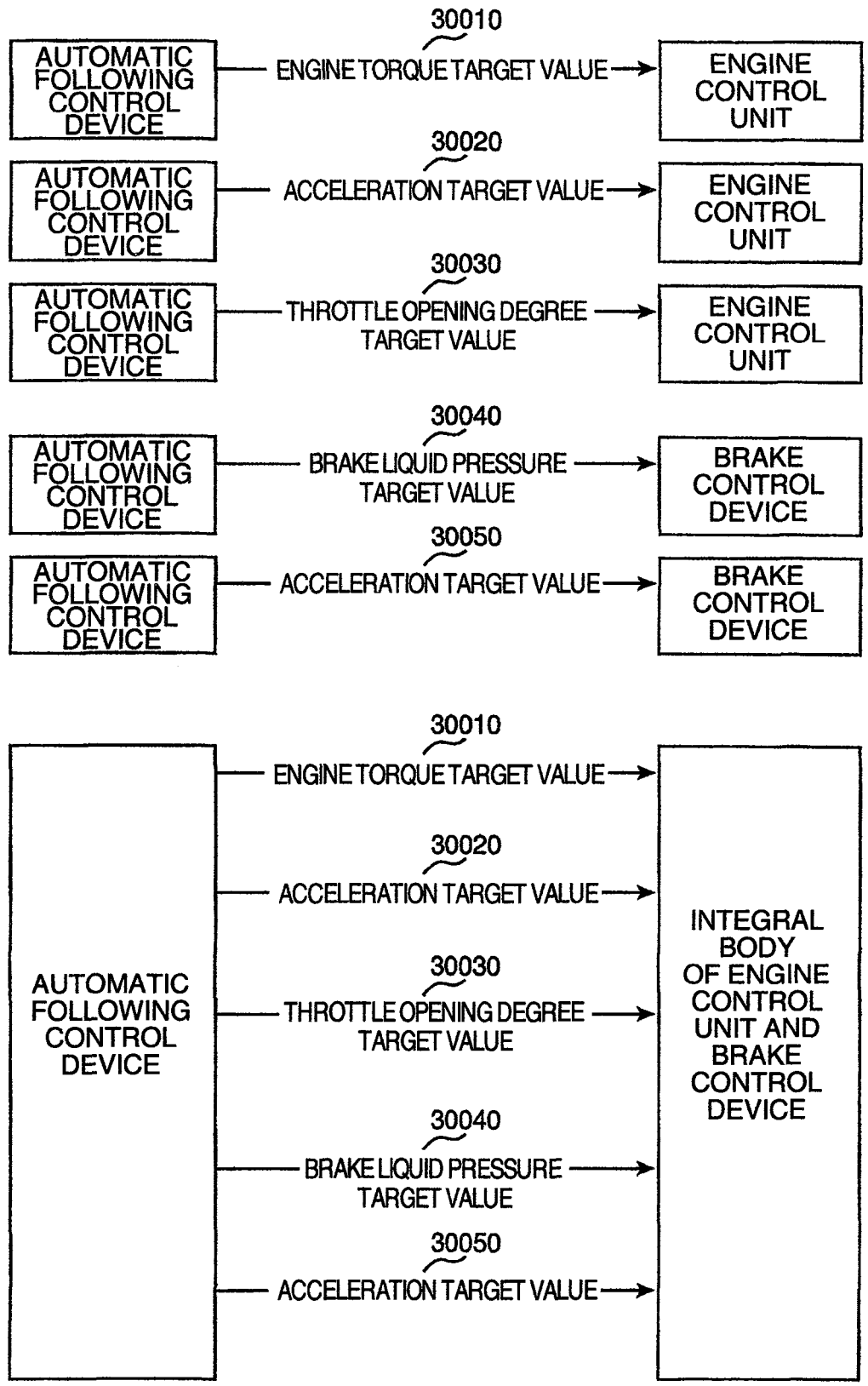
FIG. 3 shows an example of a transmitted information to an engine control unit and a brake control device.

Further, as shown in FIG. 3, the control amount to the engine control unit may be constituted by an engine torque target value 30010, an acceleration target value 30020 or a throttle opening degree target value 30030. Further, the control amount to the brake control device may be constituted by a brake liquid pressure target value 30040, or an acceleration target value 30050. Further, the structure may be made such that the engine control unit and the brake control device are integrated. The control amount from the automatic following control device is not limited to the target value mentioned above, but may be set a control amount necessary for executing the automatic following control to the target value.

A description will be given of a brake liquid pressure driving method with reference to FIGS. 4 to 7, and a brake control method in the conventional automatic following control device with reference to FIG. 8.

Figure 4:
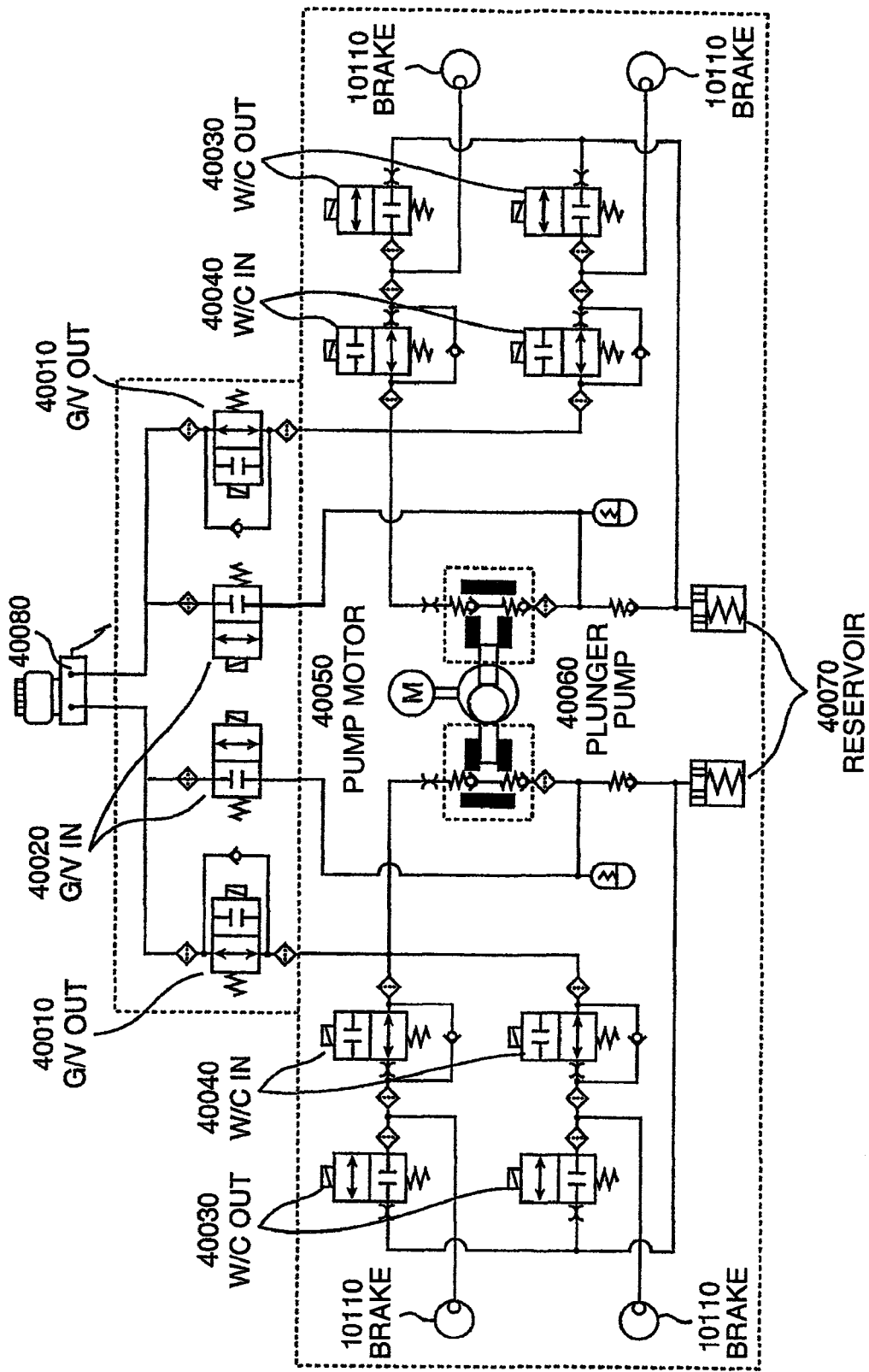
FIG. 4 is a block diagram of a brake device.

FIG. 4 shows a brake liquid pressure driving portion. A hydraulic circuit is structured by two systems, and these two systems include a case corresponding to an X piping. In this case, the X piping means a piping method in which a direction of the liquid pressure piping of the brake is constituted by a combination of a left front wheel and a right rear wheel and a combination of a right front wheel and a left rear wheel, and these two combinations are independently piped. In this X piping, since the independent pipings are formed in cross shape, the pipings are called as the X piping. Accordingly, the left front wheel and the right rear wheel are connected to the first system, and the right front wheel and the left rear wheel are connected to the second system. A plunger pump 40060 is used as a pump for increasing the brake liquid pressure. An out side gate value (G/V OUT) 40010 is a value arranged in an upstream side of a branch pipe portion of the brake piping, and shutting off and communicating with a master cylinder 40080. The out side gate valve (G/V OUT) 40010 in FIG. 4 is shown as a communicated state. An in side gate valve (G/V IN) 40020 is a valve shutting off and flowing out the liquid in the side of the master cylinder 40080 with respect to the pump. The in side gate valve (G/V IN) 40020 in FIG. 4 is shown as a shutoff state. An outflow valve (W/C OUT) 40030 is a valve shutting off and communicating a drain circuit relieving the brake fluid in the wheel cylinder to the master cylinder side. An inflow valve (W/C IN) 40040 is a valve provided in each of the branch pipe portions so as to shut off and communicate the branch pipe portion. A pump motor 40050 turns a motor on the basis of a motor drive DUTY from the brake control device, and drives the pump. A reservoir 40070 is provided in a drain circuit relieving the brake fluid in the wheel cylinder to the master cylinder side so as to reserve the brake fluid.

Figure 5:
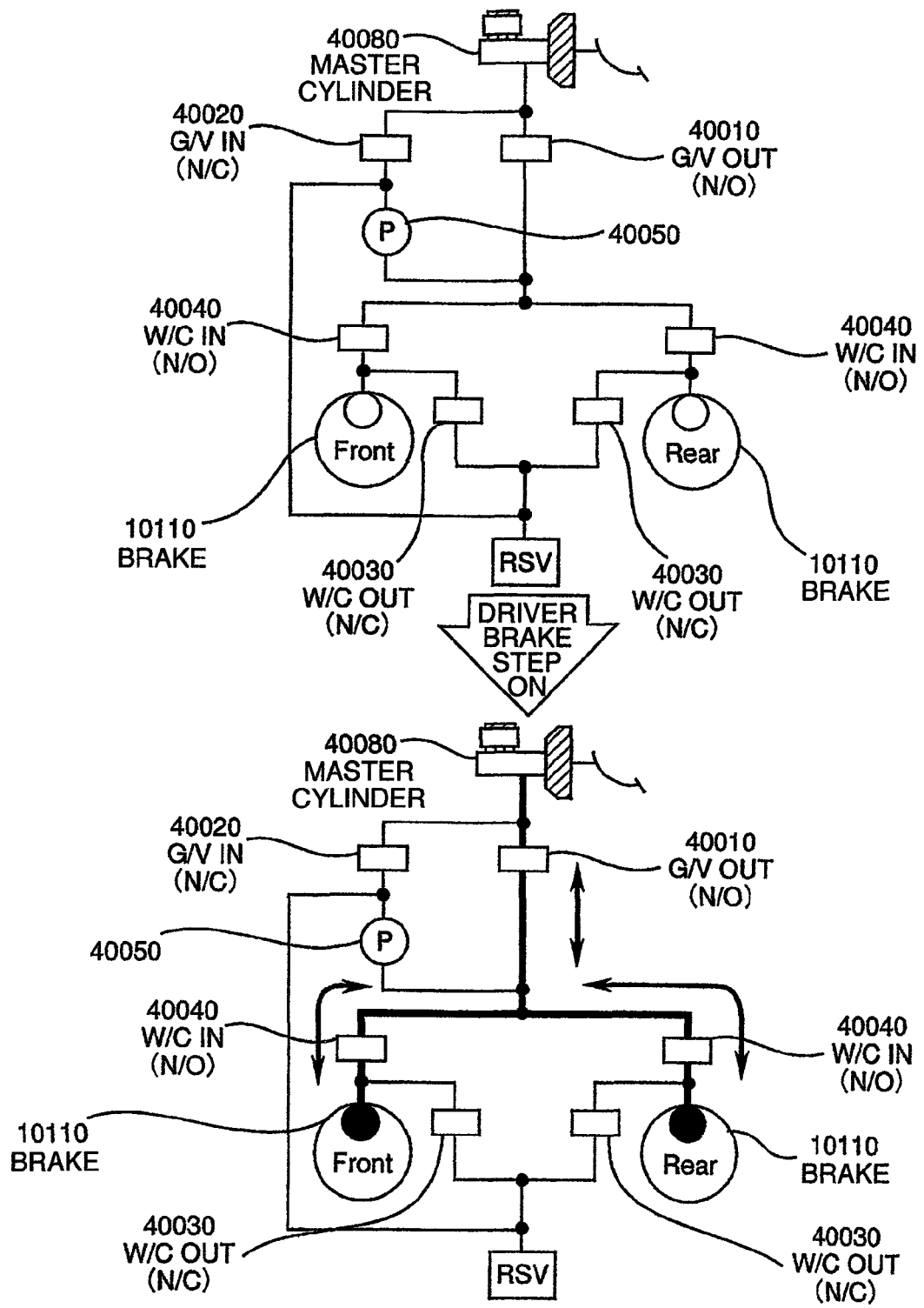
FIG. 5 is a flow chart of a brake fluid pressure at a time of operating a brake pedal by a driver.

FIG. 5 explains a motion of the actual brake liquid pressure 20090 in the case that the driver steps down the brake pedal, during a non-control of the brake control apparatus 10080, that is, at a time when the automatic following control device is not operated. N/O (normal open) corresponding to each of the valves indicates a valve which is always open, and N/C (normal close) indicates a valve which is always closed. In other words, the valve which is always in the N/O (normal open) state comes to a shutoff state at a time of being driven, and the valve which is always in the N/C (normal close) state comes to a communicated state at a time of being driven.

In the case that the driver steps down the brake pedal at a time when the automatic following control device is not operated, the valves 40010 to 40040 are all in a non-driven state, and the valve 40010 is in an open state. Accordingly, an ascent of the actual brake liquid pressure 20090 is transmitted to the brake 10110 as it is. An arrow in the drawing indicates a flow of the brake fluid, and a two-way arrow indicates that the brake fluid is held at a brake liquid pressure equal to or less than a predetermined value within the brake piping.

Figure 6:
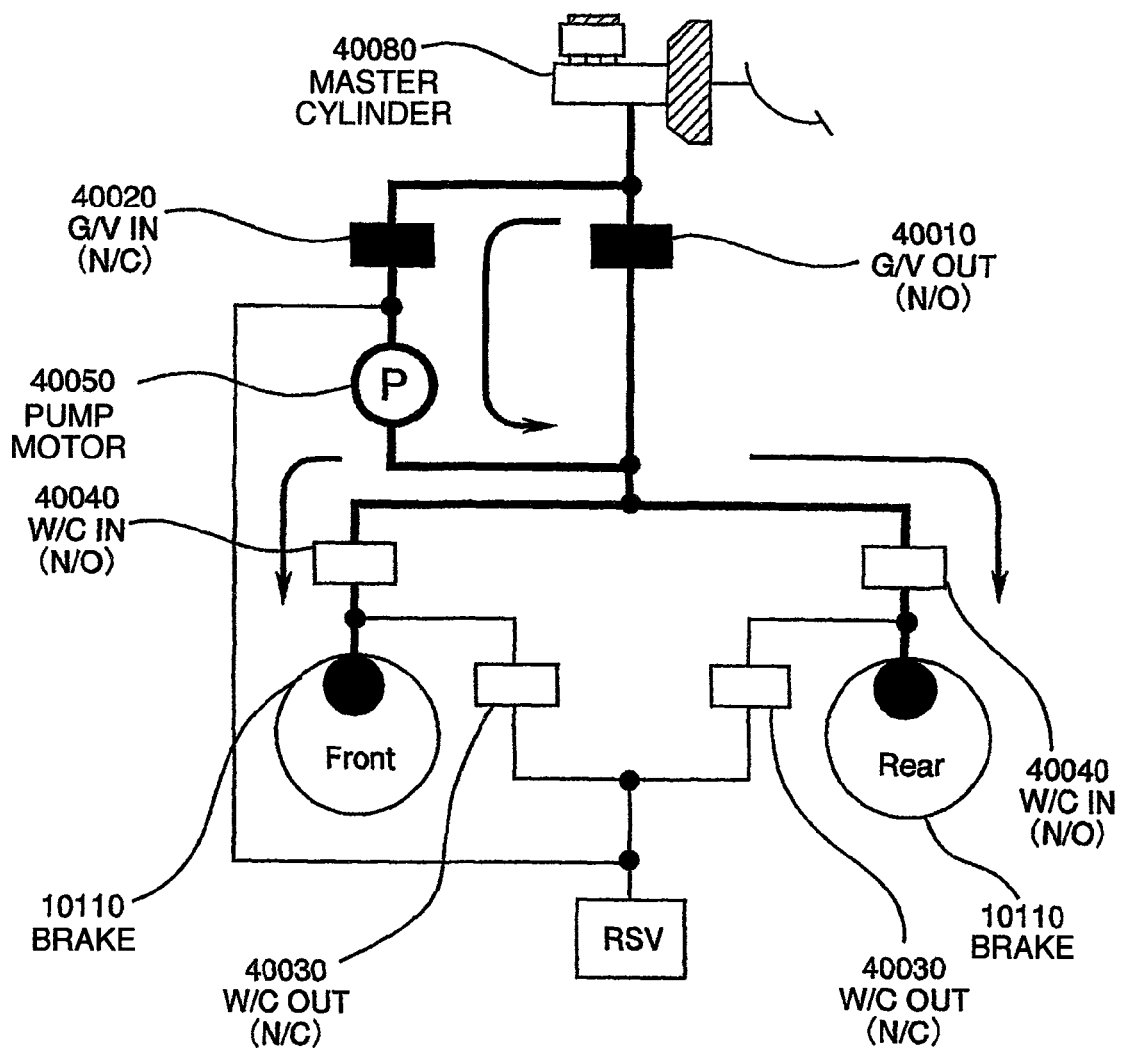
FIG. 6 is a flow chart of a pressure increasing time brake fluid pressure by a brake control device at a time of operating the automatic following control device.

FIG. 6 shows a brake hydraulic path view at a time of increasing a pressure by the brake control device at a time when the automatic following control device is operated. The pressure increase of the actual brake liquid pressure 20090 is executed by setting the in side gate valve (G/V IN) 40020 to an ON state (an open state), setting the out side gate valve (G/V OUT) 40010 to an ON state (a closed state or controlling a holding current in correspondence to the liquid pressure) and setting the pump motor 20090 to an ON state (controlling the pressure increasing slope in correspondence to the motor rotating speed) 40050, in accordance with the signal from the brake control device.

Figure 7:
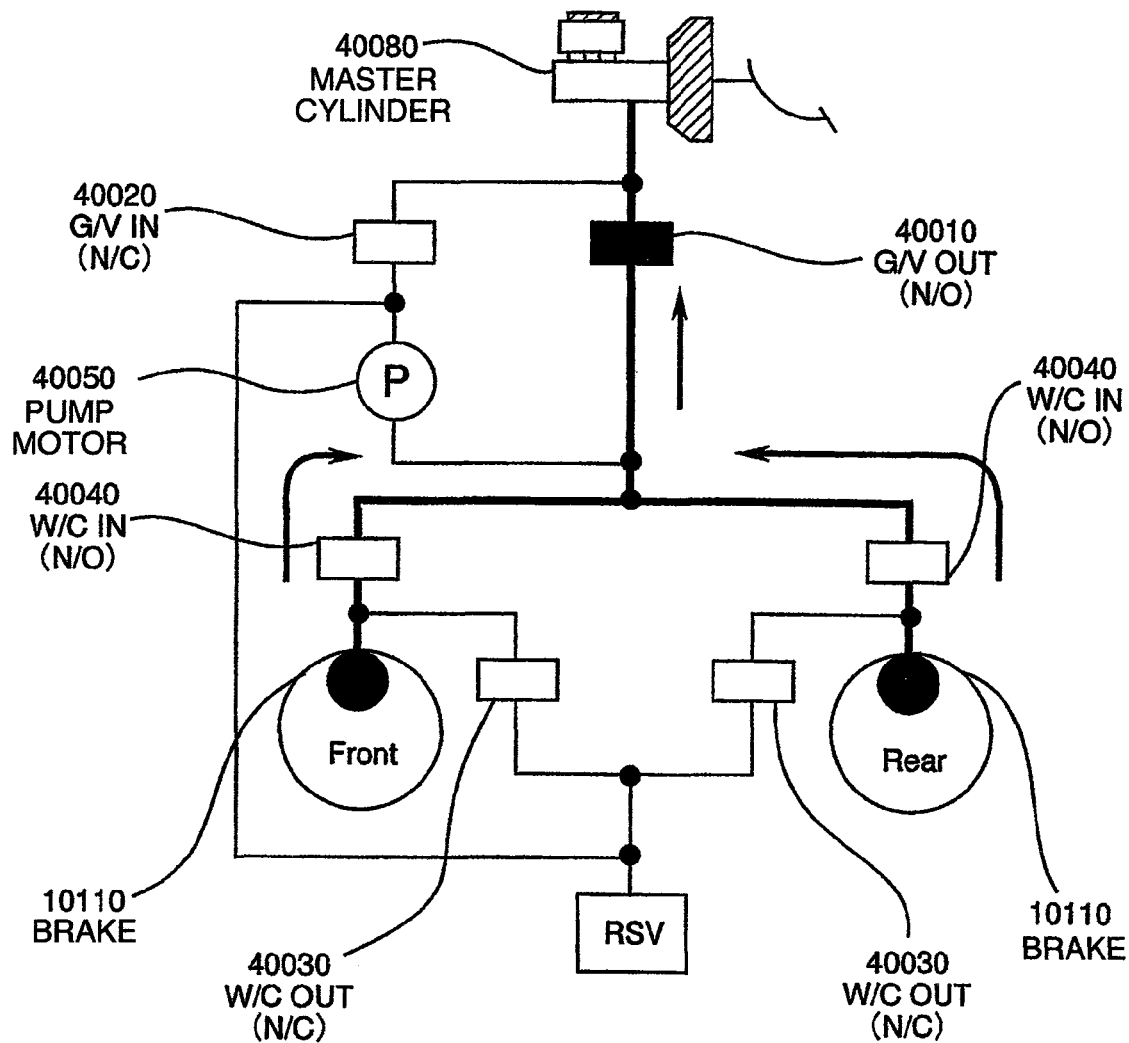
FIG. 7 is a flow chart of the brake fluid pressure at a time of holding or depressurizing by the brake control device at a time of operating the automatic following control device.

FIG. 7 shows a brake hydraulic path view at a time of holding or depressurizing by the brake control device at a time when the automatic following control device is operated. The pressure decrease of the actual brake liquid pressure 20090 is executed by setting the in side gate valve (G/V IN) 40020 to an OFF state (a closed state), setting the out side gate valve (G/V OUT) 40010 to the ON state (the closed state or controlling the holding current in correspondence to the liquid pressure), setting the pump motor 40050 to an OFF state or an extremely low rotation, and controlling the pressure decreasing slope in correspondence to an electric current of the out side gate valve.

In accordance with the structure as shown in FIGS. 6 and 7, it is possible to control the liquid pressure of the brake fluid in correspondence to the rotating speed of the pump motor 40050 and the electric current of the out side gate valve (G/V OUT) 40010.

Figure 8:
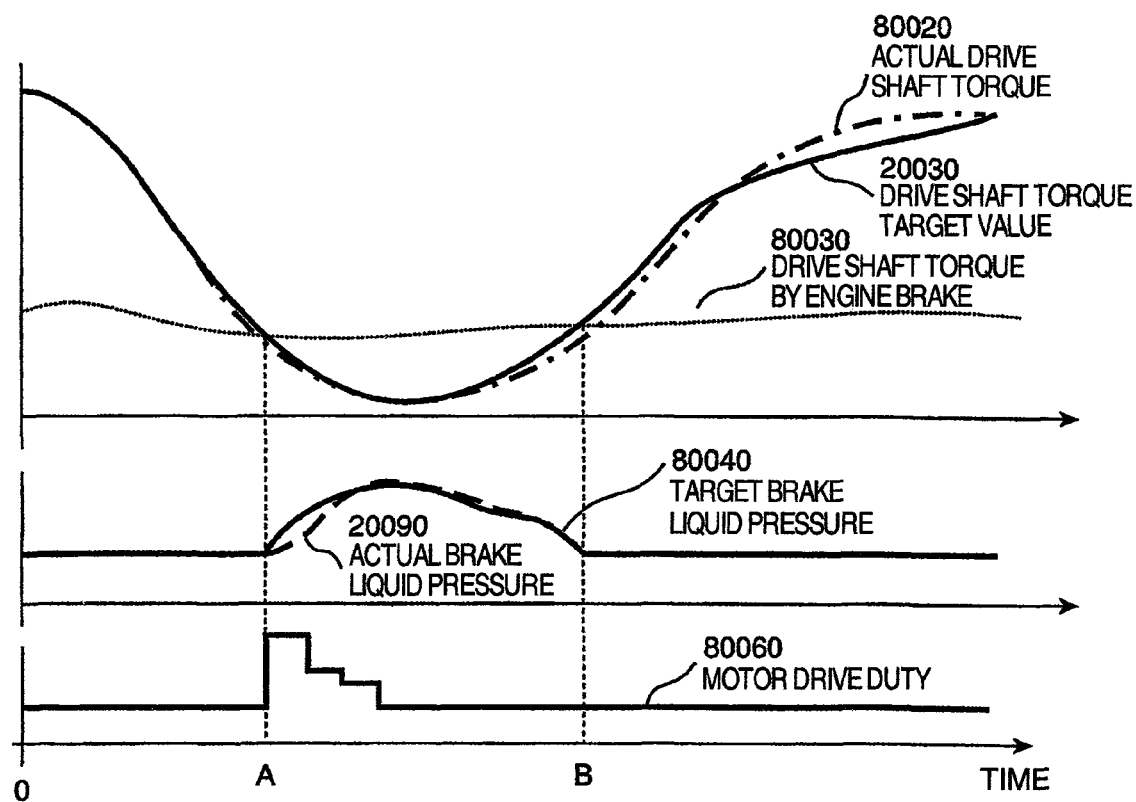
FIG. 8 shows a conventional brake liquid pressure control example.

FIG. 8 explains the conventional automatic brake control at a time when the automatic following control device 10060 is operated. A horizontal axis indicates a time, and an actual drive shaft torque 80020 means an actual vehicle drive shaft torque value, and approximately coincides with the drive shaft torque target value 20030 output from the automatic following control device 10060.

A drive shaft torque 80030 by an engine brake means a drive shaft torque in the case of only the engine brake without any brake, and contributes as a deceleration of the vehicle in a vehicle speed region in which the self vehicle speed is higher than a creep vehicle speed. In other words, it shows a state from a time 0 to a time A in FIG. 8, or a state after a time B.

On the other hand, in a vehicle speed region in which the self vehicle speed is lower than the creep vehicle speed, the self car travels at the creep vehicle speed, and in the case that the automatic following control device 10060 outputs the target vehicle speed smaller than the creep vehicle speed, it is necessary to actuate an automatic brake. In other words, it shows a state from the time A to the time B. Further, since the drive shaft torque 80030 by the engine brake is changed in accordance with the rotating speed of the engine and a gear ratio of the AT, the drive shaft torque 80030 is always changed during the travel of the vehicle.

A target brake liquid pressure 80040 means a value computed within the automatic following control device 10060 or the brake control device 100080. The automatic following control device 10060 or the brake control device 10080 executes a control of a DUTY 80060 of the motor drive, in such a manner that the actual brake liquid pressure 20090 follows the target brake liquid pressure 80040. For example, as shown in FIG. 8, in the case that the drive shaft torque target value 20030 becomes lower than the drive shaft torque 80030 by the engine brake, a brake liquid pressure corresponding to a driving force of a deviation between the drive shaft torque by the engine brake and the drive shaft torque target value is set to the target brake liquid pressure 80040. The motor drive DUTY 80060 means a value indicating a DUTY ratio of a voltage pulse driving the pump motor 40050 at a time of ascending the actual brake liquid pressure 20090. The brake control device 10080 can change the actual brake liquid pressure 20090 by changing the DUTY ratio.

However, since the control is executed in such a manner that the actual brake liquid pressure 80050 follows the target brake liquid pressure 80040, however, it takes a long time to rise the actual brake liquid pressure 20090, the actual brake liquid pressure 20090 and the target brake liquid pressure 80040 do not coincide first, as shown in the drawing. Accordingly, in order to bring the actual brake liquid pressure 20090 into line with the target brake liquid pressure 80040, there is generated a problem that the initial motor drive DUTY 80060 comes to a large value, and the operation sound of the pump motor 40050 becomes large.

Figure 9:
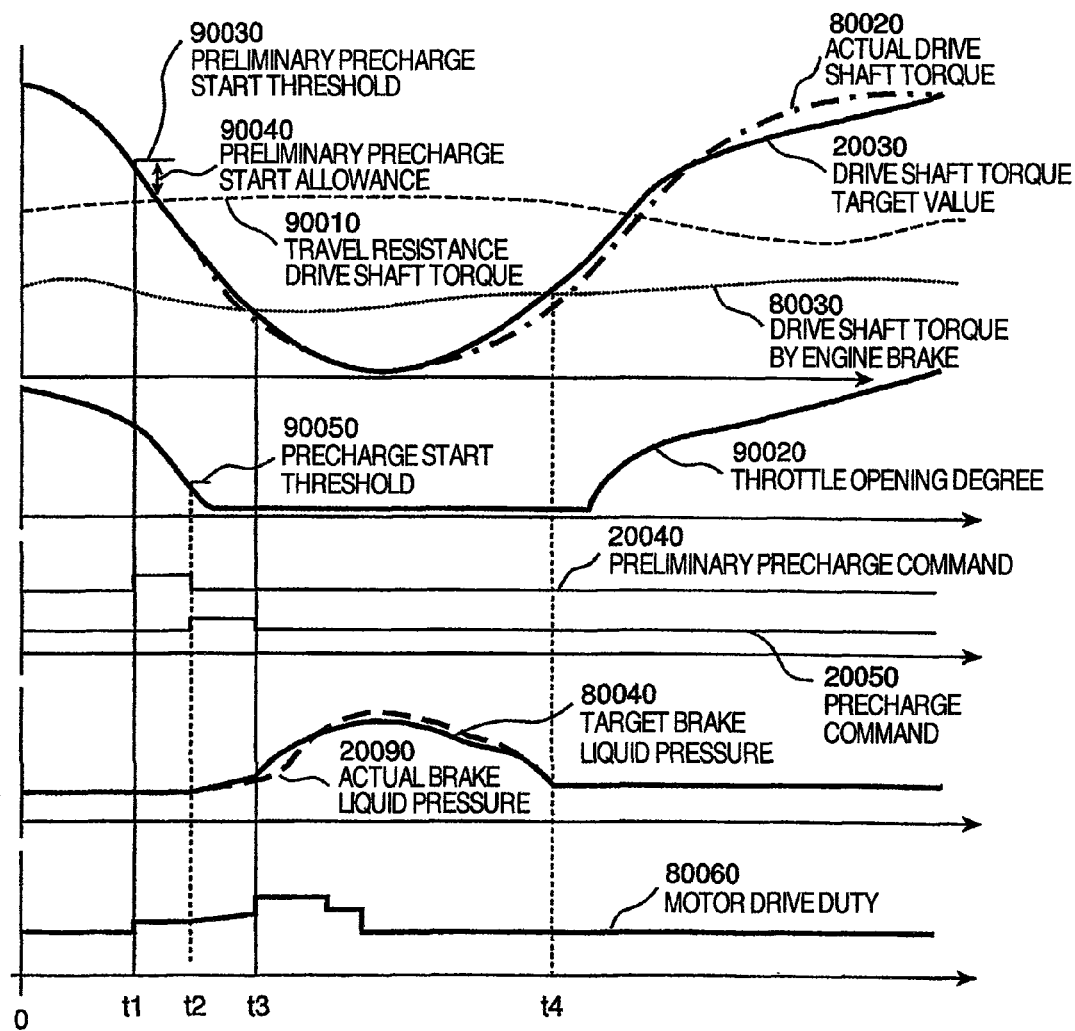
FIG. 9 shows a brake liquid pressure control example in accordance with the present invention.

FIG. 9 shows an example of a brake liquid pressure control in accordance with the present invention. First, a description will be given of the following two kinds about a state of the vehicle before starting the deceleration by the automatic brake.

(1) A state in which the drive shaft torque becomes smaller than the travel resistance (the engine brake, the air resistance, the road surface slope, the road surface resistance and the like), whereby the deceleration of the vehicle is started, however, the throttle of the engine is at an opening degree equal to or more than a predetermined opening degree.

(2) A state in which the throttle of the engine is at an opening degree smaller than the predetermined opening degree, however, the vehicle speed does not reach a maximum deceleration by the engine brake.

If the deceleration command is transmitted from the brake control device 10080, the deceleration state of the vehicle changes from (1) to (2). In the state (1) mentioned above, since the vehicle starts decelerating, it is possible to start preparing the brake. However, since the throttle is open at the predetermined opening degree or more, it is impossible to operate the brake for a safety reason that the acceleration and the deceleration are simultaneously executed, and in the light of making a drag of the brake as small as possible.

In the state (2) mentioned above, since the throttle becomes equal to or less than the predetermined opening degree or less at which no problem is generated for safety, it is possible to start the operation of the brake. However, in the case that the deceleration required by the driver can be sufficiently achieved by the deceleration by the engine brake on the basis of the relation of the following distance from the anteceding car, there is a case that it is not necessary to decelerate the vehicle by the automatic brake.

Accordingly, the pump motor 40050 described in FIGS. 4 to 7 is driven by the predetermined rotating speed to such a degree that the actual brake liquid pressure 20090 does not ascend in the state (1), and the actual brake liquid pressure 20090 is ascended to such a degree that the vehicle is not decelerated in the state (2). The degree that the vehicle is not decelerated means, for example, such a degree that the brake pad does not come into contact with the rotor. It is possible to make a delay of the actual brake liquid pressure 20050 at a time of starting outputting the target brake liquid pressure 20090 from the brake control device 10080 as small as possible, by executing the control mentioned above. In other words, in order to bring the actual brake liquid pressure 20090 into line with the target brake liquid pressure 80040, it is possible to set the initial motor drive DUTY 80060 to a small value. As a result, it is possible to execute a control of the automatic brake having no uncomfortable feeling for the driver, as well as restricting the operation sound of the pump motor 40050 at a brake operation initial time. Further, since it is possible to make the maximum value of the motor output small, it is possible to achieve a downsizing of the motor and a low cost.

Specifically, as shown in FIG. 9, if the drive shaft torque target value 20030 becomes equal to or less than a preliminary precharge start threshold 90030, the preliminary precharge command 20040 is output, and a signal is output to the motor drive DUTY 80060 (t1). At this time, the preliminary precharge start threshold 90030 can be set to a travel resistance drive shaft torque 90010, or the preliminary precharge start threshold 90030 can be set to a value obtained by adding a preliminary precharge start allowance 90040 to the travel resistance drive shaft torque 90010, as shown in FIG. 9. As mentioned above, it is possible to set the preliminary precharge start threshold 90030 having a margin with respect to an error of the vehicle, a hysteresis of the brake and a change of the traveling condition, by adding the preliminary precharge start allowance 90040 which can be optionally set. In this case, the travel resistance drive shaft torque 90010 is approximately definitely defined with respect to the vehicle speed, and can employ a table drawn by the vehicle speed. The table can be stored in the brake control device or the like.

Figure 12:
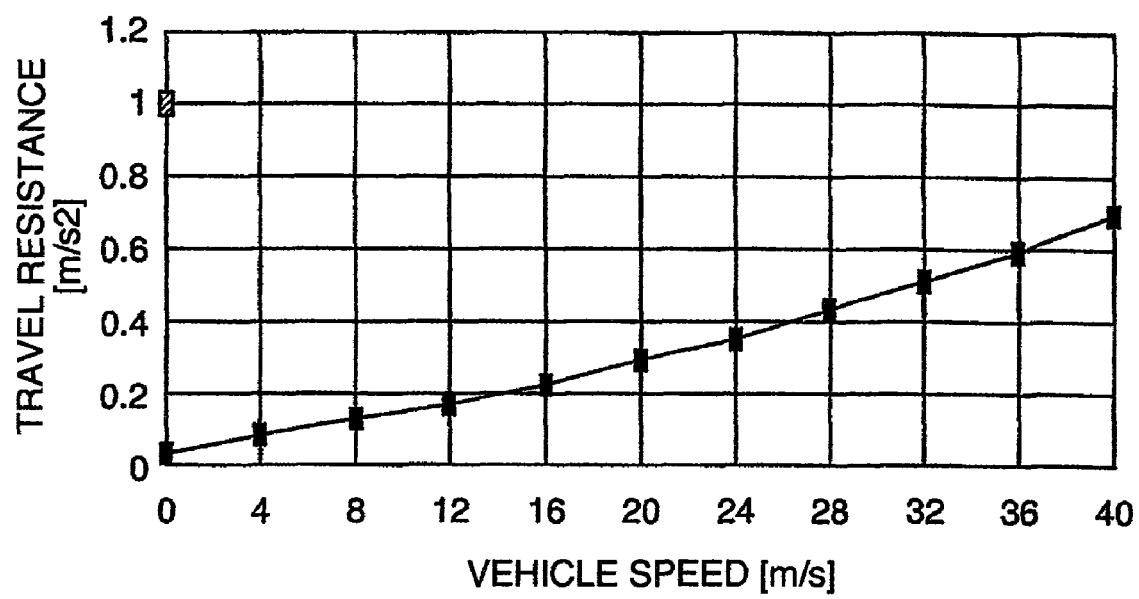
FIG. 12 is a view of a table of a travel resistance drive shaft torque.

FIG. 12 shows an example of a table of the travel resistance drive shaft torque 90010. Since the travel resistance drive shaft torque 90010 is in proportion to the vehicle speed, it is known that the vehicle speed is decreased and the travel resistance is also decreased, in the case that the automatic brake is applied. Further, the travel resistance drive shaft torque 90010 is changed in some degree in correspondence to the vehicle characteristic such as the number of the occupants, the kind of the tire and the like, however, does not affect the control of the automatic following control device (ACC). As mentioned above, it is possible to set a variable value in correspondence to the vehicle speed, by setting the travel resistance drive shaft torque 90010 to the threshold for starting the precharge of the automatic brake.

Next, if the throttle opening degree 90020 becomes equal to or less than the precharge start threshold 90050 corresponding to the predetermined opening degree, the precharge command 20050 is output (t2), and the brake control device 10080 ascends the motor drive DUTY little by little, and ascends the actual brake liquid pressure 80050 to such a degree that the vehicle is not decelerated.

In accordance with the control mentioned above, a delay time of the actual brake liquid pressure 80050 with respect to the target brake liquid pressure 20090 at a time of starting the brake control is reduced (t3), and it is possible to hold down the motor control DUTY 80060 at a time of starting the brake control.

Figure 13A:
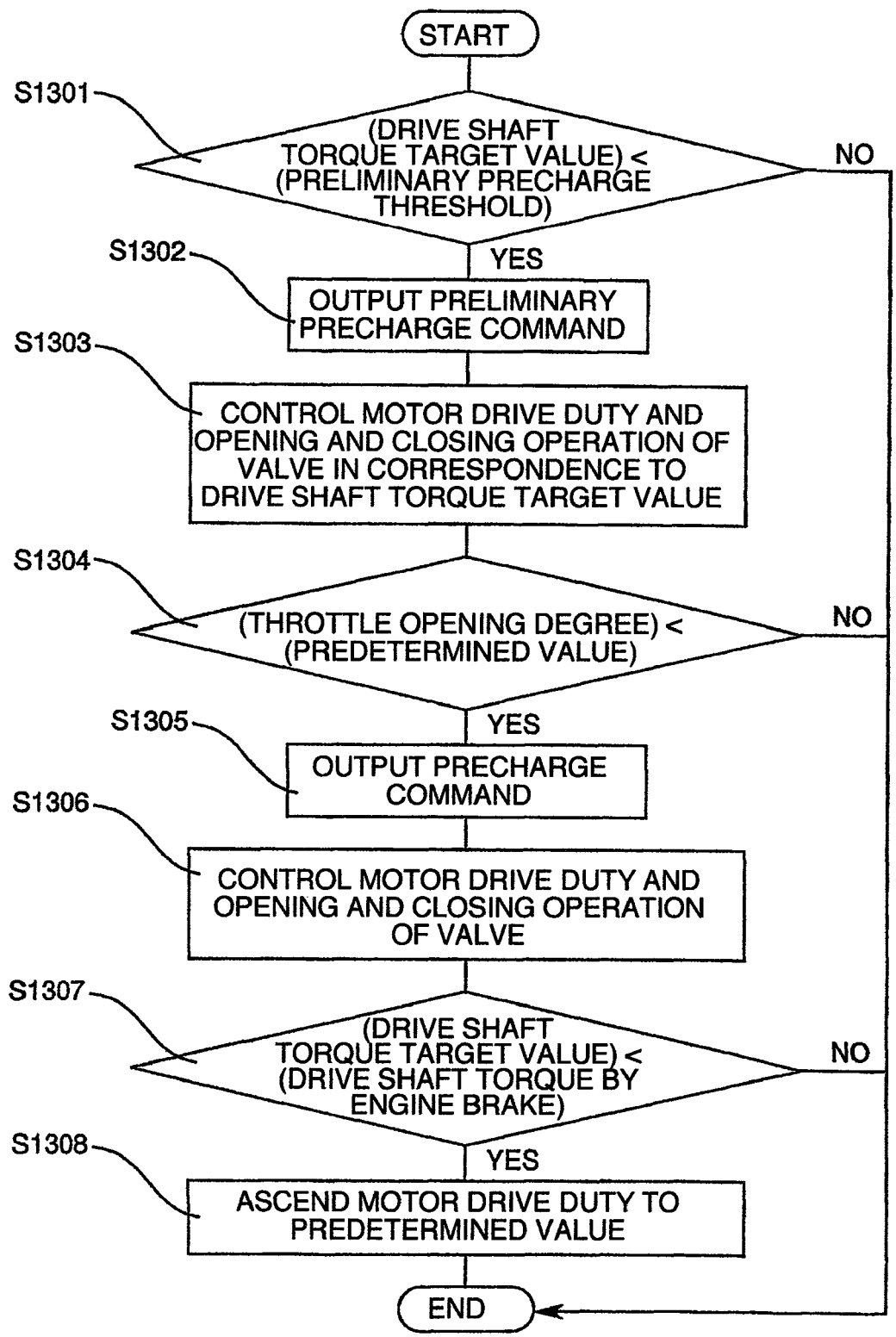
FIG. 13 is a flow chart of an automatic brake control.

FIG. 13(*a*) shows a flow chart of the automatic brake control. The preliminary precharge computing portion 10062 determines whether or not the drive shaft torque target value is smaller than the preliminary precharge threshold (S1301), and outputs the preliminary precharge command in the case of YES determination (S1302). The brake control device controls the motor drive DUTY and the opening and closing operation of the valve in correspondence to the preliminary precharge command and the current drive shaft torque target value (S1303). The precharge computing portion 10063 determines whether or not the threshold opening degree is smaller than the predetermined value (S1304), and outputs the precharge command in the case of YES determination (S1305). The brake control device controls the motor drive DUTY and the opening and closing operation of the valve in such a manner as to ascend the actual brake liquid pressure 20090 to such the degree that the vehicle is not decelerated in accordance with this precharge command (S1306). Further, the brake control device determines whether or not the drive shaft torque target value is smaller than the drive shaft torque by the engine brake (S1307), and assumes that the brake command is output in the case of YES determination so as to ascend the motor drive DUTY to such the degree that the brake force is generated (S1308).

The computation and the determination of the preliminary precharge computing portion 10062 and the precharge computing portion 10063 may be set to parallel processes as shown in FIG. 13(*b*). The contents of each of the controls is the same as FIG. 13(*a*). In accordance with this structure, even in the case that the drive shaft torque target value is larger than the preliminary precharge threshold, and the throttle opening degree is smaller than the predetermined value, it is possible to output the precharge command, and it is possible to suppress a rapid ascent of the motor drive DUTY.

Figure 10:
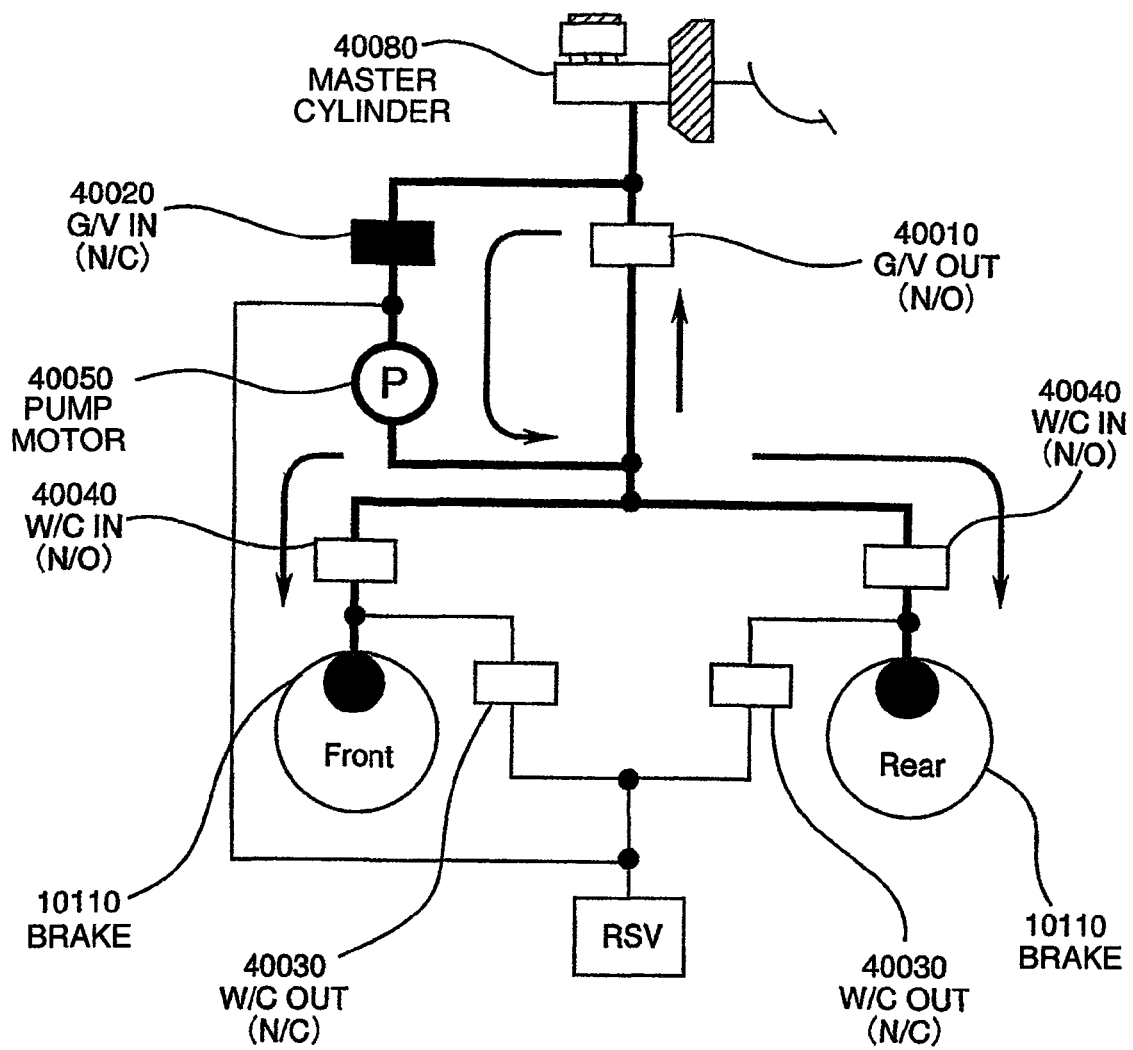
FIG. 10 is a flow chart of a brake liquid pressure at a time of a preliminary precharge command, in the brake control device.

FIG. 10 shows a flow of the brake liquid pressure in the brake control device 10080 at a time of outputting the preliminary precharge control command. At a time of outputting the preliminary precharge control command, G/V IN 40020 is set to the ON state (the open state), G/V OUT 40010 is set to the OFF state (the open state), and the pump motor 40050 is set to the ON state (the pressure increasing slope is controlled on the basis of the motor rotating speed). Accordingly, since it is possible to return the brake fluid sucked from the master cylinder 40050 to the master cylinder while the motor is rotated (the flow a of the brake fluid), it is possible to prevent the brake 10110 from being operated while operating the pump motor 40050. Accordingly, it is possible to immediately generate the brake liquid pressure at a time of changing to the pressure increasing control from the precharge control without generating the brake liquid pressure (t2 to t3 and t3 to t4 in FIG. 9), and in the case that the brake liquid pressure is going to be generated from the detected value of the pressure sensor installed in the master cylinder, it is possible to control the rotating speed of the pump motor so as to prevent the liquid pressure from being generated.

Figure 11:
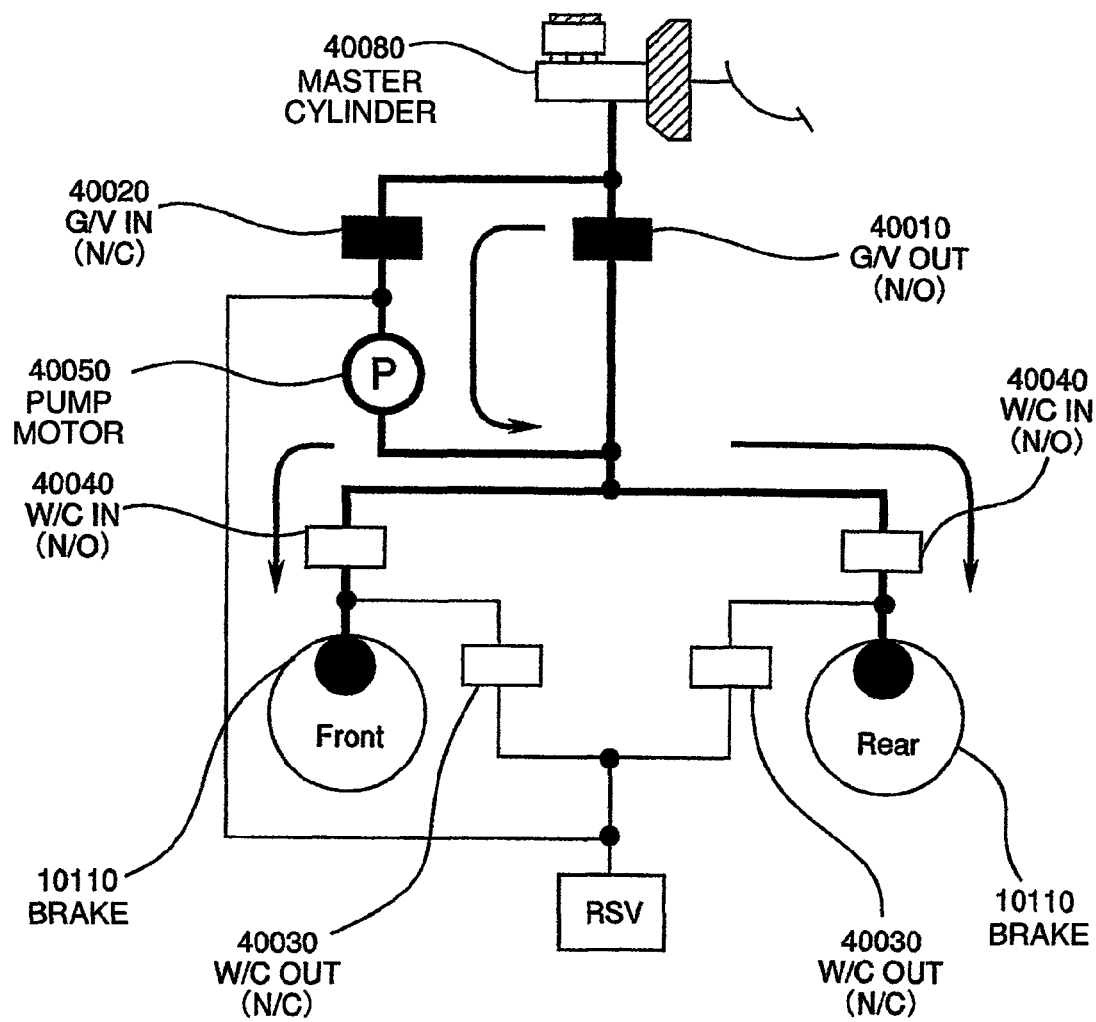
FIG. 11 is a flow chart of a brake liquid pressure at a time of a precharge command, in the brake control device.

Next, a description will be given of a brake liquid pressure driving method in the brake control device 10080 at a time when the precharge control command is in the ON state, with reference to FIG. 11. When the precharge control command is in the ON state, G/V IN 40020 is set to the ON state (the open state), and G/V OUT 40010 and the pump motor 40050 are controlled so as to be turned on and off. In this case, G/V OUT 40010 controls the holding current in correspondence to the liquid pressure, and the pump motor 40050 controls the brake liquid pressure increasing slope on the basis of the motor rotating speed.

Figure 14:
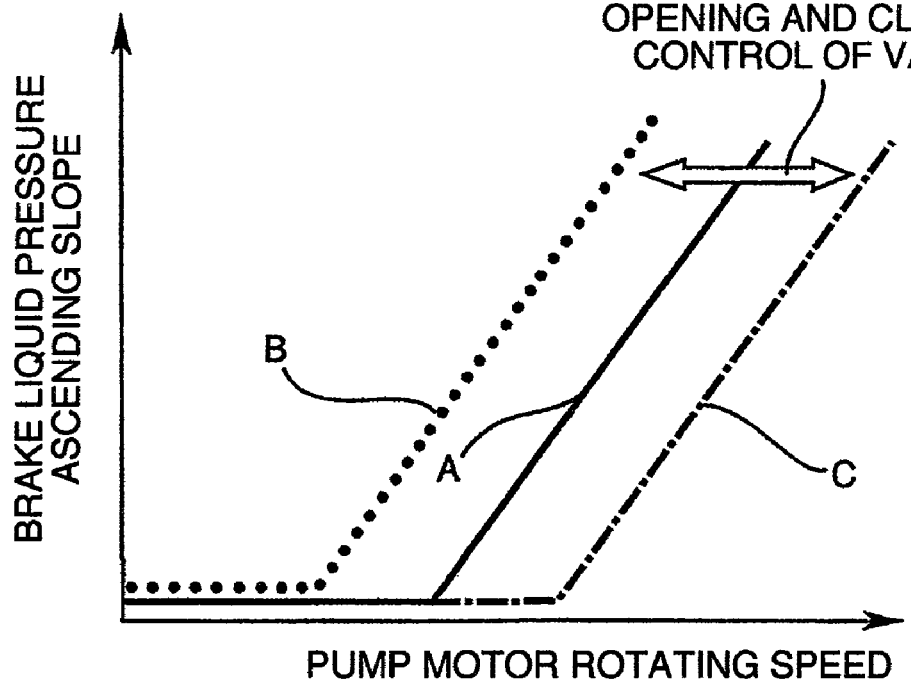
FIG. 14 is a view of a relation between a rotating speed of a pump motor and a pressure increasing slope of the brake liquid pressure.

FIG. 14 shows a relation between the motor rotating speed of the pump motor and the brake liquid pressure increasing slope. The relation can be changed, for example, from A to B or from A to C, or the like by changing the holding current of G/V OUT 40010. Accordingly, since it is possible to increase the pressure while holding down the inflow of the brake fluid into the pump motor 40050 from the master cylinder 40050, it is possible to operated the brake 10110 to such the degree that the vehicle is not decelerated.

Further, in the present embodiment, the ON and OFF determination of the preliminary precharge command 20040 and the precharge command 20050 is executed by the automatic following control device 10060, however, the determination may be executed by the brake control device 10080.

The brake control device can execute the control without the preliminary precharge command 20040 and the precharge command 20050, for example, by executing the preliminary precharge control if the acceleration of the vehicle becomes lower than the acceleration corresponding to the travel resistance, and executing the precharge control if the acceleration comes to the acceleration corresponding to the engine brake.

Further, in the present embodiment, the start threshold of the preliminary precharge control is set to the travel resistance, and the precharge control start threshold is set to the engine brake torque, however, this is only an example, and the start timings of the preliminary precharge control and the precharge control are not necessarily based on the travel resistance and the engine brake torque as far as it is possible to start the preliminary precharge control and the precharge control before starting the brake liquid pressure control without any problem for safety and on the operation of the vehicle, but can be determined on the basis of the map of the acceleration and the speed.

Further, the structure may be made such as to be provided with an output function for displaying an output condition of the preliminary precharge command 20040 or the precharge command 20050 on an interface portion to the driver, and inform the driver of a timing at which the braking force is generated, in advance.

INDUSTRIAL APPLICABILITY

As mentioned above, the travel control device in accordance with the present invention can be applied to the travel control device of the automatic following control for controlling the braking force by driving the hydraulic pressure by the motor.

The invention claimed is:

1. A travel control device comprising:
   a drive shaft torque computing portion for computing a drive shaft torque target value on the basis of a detected result from an environment recognition device detecting at least one of a following distance between a self car and an anteceding car and a relative speed therebetween;
   a preliminary precharge control portion for controlling a pump motor controlling a brake liquid pressure as to set the pump motor to a first preliminary operation state operating at a first rotating speed, on the basis of the drive shaft torque target value computed by the drive shaft torque computing portion; and
   a precharge control portion for controlling the pump motor to set to a second preliminary operation state operating at a second rotating speed which is higher than the predetermined rotating speed, on the basis of a throttle opening degree of an engine throttle.

2. A travel control device as claimed in claim 1, wherein the preliminary precharge control portion controls the pump motor as to come to the first preliminary operation state, at a time when the drive shaft torque target value of the drive shaft torque computing portion is smaller than a predetermined value.

3. A travel control device as claimed in claim 1, wherein the preliminary precharge control portion controls the pump motor as to come to the second preliminary operation state, at a time when the throttle opening degree is smaller than a predetermined opening degree.

4. A travel control device as claimed in claim 1, wherein the first rotating speed corresponds to a rotating speed at which a brake liquid pressure within a brake piping becomes lower than a predetermined pressure.

5. A travel control device as claimed in claim 1, wherein the second rotating speed corresponds to a rotating speed at which a brake liquid pressure within a brake piping becomes higher than a predetermined pressure, and becomes lower than a brake liquid pressure at which a brake pad comes into contact with a brake rotor.

6. A travel control device as claimed in claim 1, wherein the drive shaft torque computing portion computes the drive shaft torque that the following distance between the anteceding car and the self car comes to a target following distance set by a driver, on the basis of a detected result from the environment recognition device and a detected result from a vehicle speed detecting device detecting a vehicle speed of the self car.

7. A travel control device as claimed in claim 6, further comprising:
   a travel resistance drive shaft torque computing portion for computing a travel resistance drive shaft torque of the vehicle on the basis of the detected result of the vehicle speed detecting device,
   wherein the preliminary precharge control portion controls the pump motor as to come to the first preliminary operation state, at a time when the drive shaft torque target value of the drive shaft torque computing portion is smaller than the travel resistance drive shaft torque computed by the travel resistance drive shaft torque computing portion.

8. A travel control device as claimed in claim 1, wherein the precharge control portion controls a rotating speed of the pump motor and an opening degree of a valve connected to a first brake piping communicating a master cylinder and a brake device that a brake liquid pressure within a brake piping becomes higher than a predetermined pressure, and smaller than a brake liquid pressure at which a brake pad comes into contact with a brake rotor, on the basis of the drive shaft torque target value computed by the drive shaft torque computing portion and the throttle opening degree.

9. A travel control device as claimed in claim 1, further comprising an output portion for outputting a signal for displaying the first preliminary operation state and the second preliminary operation state to a driver.

* * * * *